United States Patent
Hoskins et al.

(10) Patent No.: US 10,052,554 B2
(45) Date of Patent: Aug. 21, 2018

(54) SUGGESTING MATCHES FOR PLAYERS OF AN ONLINE MULTIPLAYER GAME BASED ON SKILLS AND/OR SOCIAL PROXIMITY

(71) Applicant: FACEBOOK, INC., Menlo Park, CA (US)

(72) Inventors: Andrew Hoskins, Burlingame, CA (US); Aaron Brady, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 483 days.

(21) Appl. No.: 13/835,604

(22) Filed: Mar. 15, 2013

(65) Prior Publication Data

US 2014/0274404 A1    Sep. 18, 2014

(51) Int. Cl.
| | |
|---|---|
| A63F 13/12 | (2006.01) |
| A63F 13/335 | (2014.01) |
| A63F 13/795 | (2014.01) |
| A63F 13/798 | (2014.01) |

(52) U.S. Cl.
CPC .......... *A63F 13/335* (2014.09); *A63F 13/795* (2014.09); *A63F 13/798* (2014.09)

(58) Field of Classification Search
CPC ................... G07F 17/3213; G07F 17/3244
USPC ............................... 463/40, 42, 43
See application file for complete search history.

(56) References Cited

U.S. PATENT DOCUMENTS

| | | | |
|---|---|---|---|
| RE45,040 E | 7/2014 | Fish | |
| 2008/0033776 A1* | 2/2008 | Marchese | G06Q 20/10 705/7.33 |
| 2008/0242420 A1 | 10/2008 | Graepel et al. | |
| 2009/0075738 A1 | 3/2009 | Pearce | |
| 2009/0098918 A1 | 4/2009 | Teasdale et al. | |
| 2009/0156312 A1 | 6/2009 | Ng et al. | |
| 2010/0160038 A1* | 6/2010 | Youm | A63F 13/10 463/29 |
| 2011/0276639 A1* | 11/2011 | Schrader | G06Q 30/02 709/206 |
| 2012/0088561 A1* | 4/2012 | Hohmann | A63F 9/183 463/1 |
| 2012/0122552 A1* | 5/2012 | Youm | A63F 13/77 463/23 |
| 2012/0252418 A1* | 10/2012 | Kandekar et al. | 455/414.1 |
| 2012/0290109 A1 | 11/2012 | Engelberg et al. | |
| 2013/0151527 A1 | 6/2013 | Bruich et al. | |

(Continued)

OTHER PUBLICATIONS

Final Office Action for U.S. Appl. No. 13/801,725, dated Feb. 10, 2015, 16 pages.

(Continued)

*Primary Examiner* — Dmitry Suhol
*Assistant Examiner* — Brandon Gray
(74) *Attorney, Agent, or Firm* — FisherBroyles, LLP

(57) ABSTRACT

Exemplary methods, apparatuses, and systems provide a user of a social network system access to a game over a network from a user device. The social network system matches the user with players of the game based on respective skill levels of the players and/or social proximity between the user and the players. The social network system sends a list of matched players to the user device for selection by the user, and sends an invitation to one or more of the players selected by the user to enable the user to play the game over the network with the one or more players.

18 Claims, 9 Drawing Sheets

(56) References Cited

U.S. PATENT DOCUMENTS

2013/0165234 A1* 6/2013 Hall ................... A63F 13/00
463/42

OTHER PUBLICATIONS

Non-Final Office Action for U.S. Appl. No. 13/801,725, dated Oct. 27, 2015, 10 pages.
Non-Final Office Action for U.S. Appl. No. 13/801,725, dated Sep. 16, 2014, 16 pages.

* cited by examiner

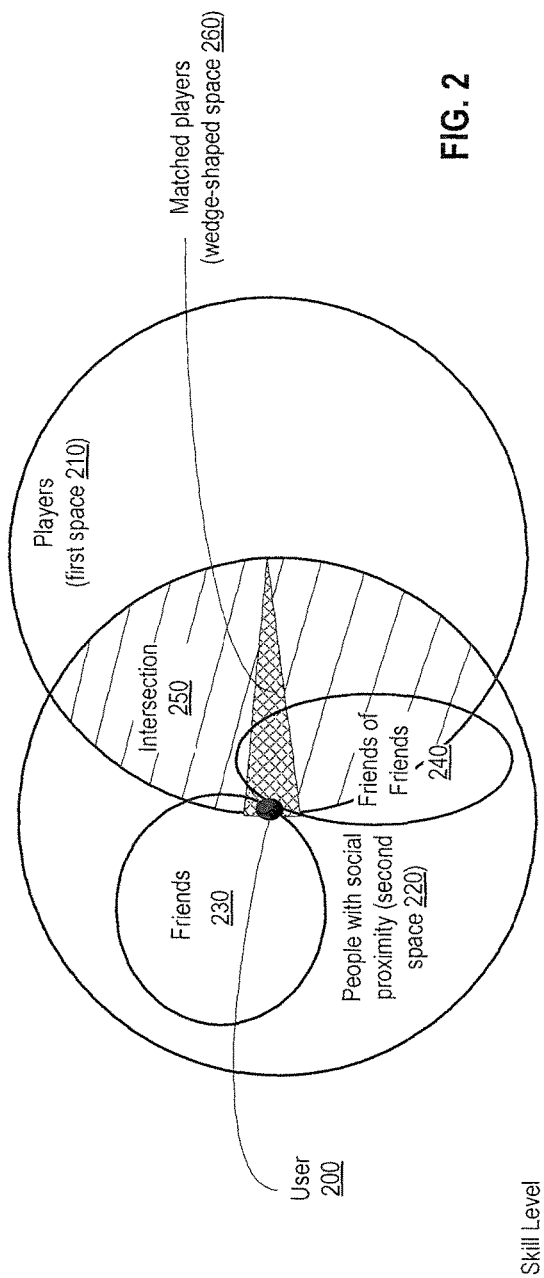

SUGGESTING MATCHES FOR PLAYERS OF AN ONLINE MULTIPLAYER GAME BASED ON SKILLS AND/OR SOCIAL PROXIMITY

FIELD

The various embodiments described herein relate to social networks. In particular, the embodiments relate to integration of online gaming with a social network.

BACKGROUND

Social networking systems have become prevalent in recent years because they provide an environment in which users can connect to and communicate with other users. Social networking systems commonly provide mechanisms allowing users to interact within their social networks. In this context, a user may be an individual or any other entity, such as a business or other non-person entity. A social networking system allows users to designate other users or entities as connections (or otherwise connect to, or form relationships with, other users or entities), contribute and interact with their connections, use applications, join groups, list and confirm attendance at events, invite connections, and perform other tasks that facilitate social interaction.

One type of application that a user of a social networking system can access is an online game. A social networking system can serve as a platform for its users to play online games and share their gaming experiences.

BRIEF DESCRIPTION OF THE DRAWINGS

The present invention is illustrated by way of example and not limitation in the figures of the accompanying drawings, in which like references indicate similar elements, and in which:

FIG. 2 is a diagram illustrating a number of intersecting spaces within which matched players can be identified, according to one embodiment of the invention;

FIG. 3A-B illustrate skill ratings and skill levels according to embodiments of the invention;

DETAILED DESCRIPTION

Figure 1A:
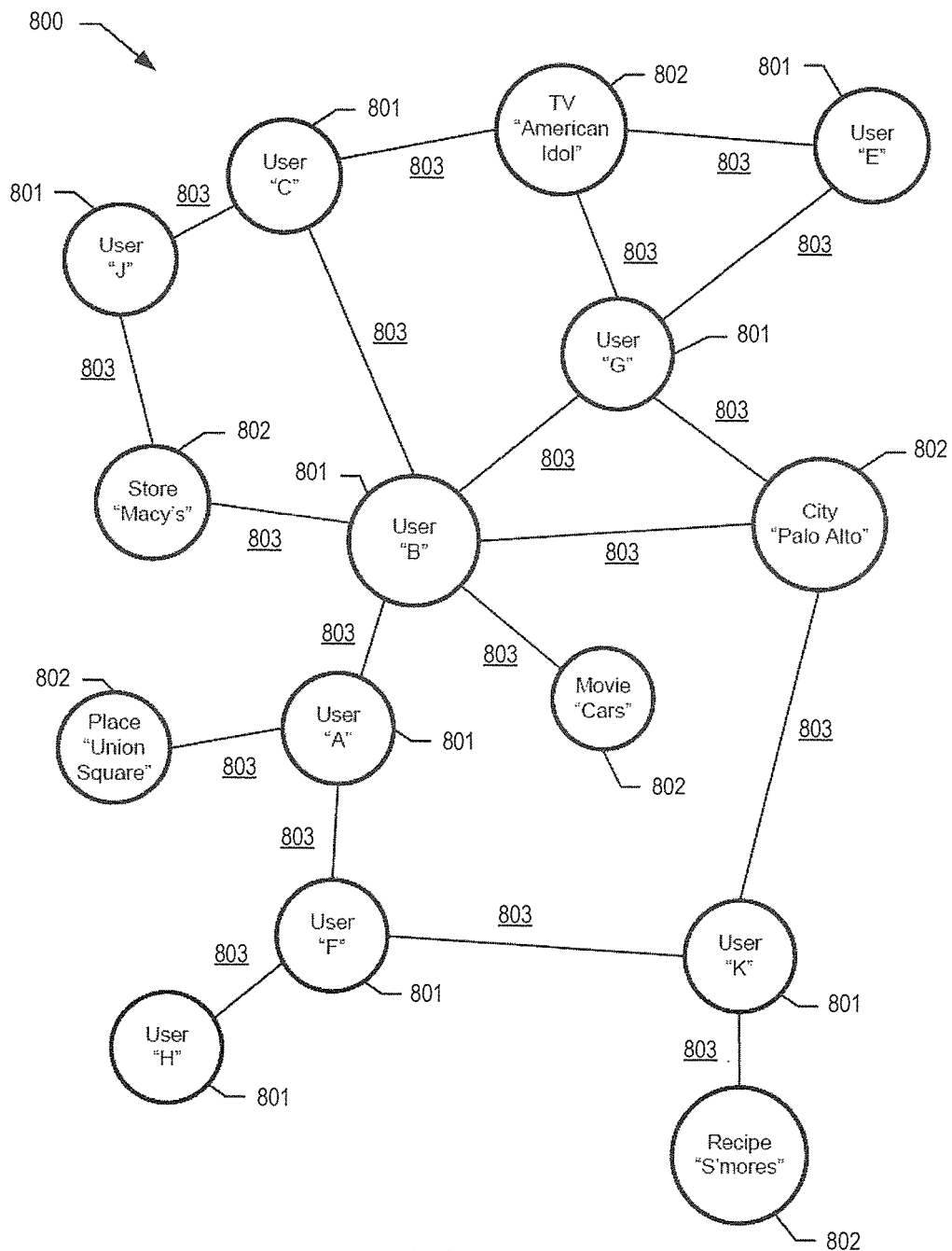
FIG. 1A illustrates an example social graph that may be used by a social networking system.

Embodiments described herein include methods, apparatuses, and systems for matching players of an online multiplayer game. More specifically, a user of a social networking system, who is also a player of an online multiplayer game, is matched with other players (also referred to as "co-players") of the game. In some embodiments, co-players are selected from a pool of players who have the same or similar skill level as the user at a game or genre of game. Additionally, in some embodiments, co-players are selected based on their social proximity to the user. Social proximity is an indicator of the degree of closeness or commonality between people. Social proximity can be determined from the social data collected by a social networking system and/or from players' information collected by a game service system. The use of social proximity in player matching allows for the identification of co-players who have one or more things in common with the user (e.g., they are friends, live in the same geographic location, are of the same gender, of similar age, live in the same time zone or a time zone conducive to playing a game together, etc.). These players are more likely to accept the user's invitations, and it may be more fun for the user to play with these players. Thus, the social networking system provides enhanced game playing experiences for its users.

A social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system. For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). For example, in response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user. A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept. An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social networking system a request to create an edge between a user node of the user and a concept node of the concept, indicating a relationship between the user and the concept (e.g., the user checks in a restaurant, or the user "likes" a celebrity, etc.). For example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia files to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

FIG. 1A illustrates an example social graph 800 that may be used by a social networking system. In the example of FIG. 1A, social graph 800 includes user nodes 801, concept nodes 802, and edges 803 between nodes. An edge 803 between a pair of nodes may represent a relationship (or an action) between the pair of nodes. For example, user "G" is a friend of user "B", user "C", and user "E", respectively, as illustrated by the edges between user nodes "G" and "B", between user nodes "G" and "C", and between user nodes "G" and "E." For example, users "C", "E", and G" watch (or "like") a TV show "American Idol", as illustrated by the edges between the "American Idol" concept node and user nodes "C", "E", and G", respectively. Similarly, the edge between the user node "B" and the concept node "Palo Alto" may indicate that user "B" declares "Palo Alto" as his or her city of residence. The edge between the user node "B" and the concept node "Macy's" may indicate that user "B" likes the store "Macy's." Of course, social graphs can be much larger than social graph 800 illustrated in FIG. 1A, and the number of edges and/or nodes in a social graph may be many orders of magnitude larger than that depicted herein.

As described earlier, an edge between a pair of nodes may indicate a direct relationship between the pair of nodes. An edge may be directed and connect an ordered pair of nodes. For example, an edge connecting a user node corresponding to a user and a concept node corresponding to a city may be directed (i.e., the user lives in the city). An edge may be undirected, as a pair of nodes connected by the edge does not have a particular order. For example, an edge connecting two user nodes can be undirected as the edge indicates a friendship between two users corresponding to the two user nodes. As described earlier herein, a degree of separation between any two nodes is defined as the minimum number of hops required to traverse the social graph from one node to the other. Thus, for user "B", the nodes for users "A", "C", and "G" are all one hop away and are thus users of first-degree and may be described as "connected to" or "friends" of user "B." However, from the standpoint of user "B", the nodes for users "E", "F", "J", and "K" are considered to have a second-degree of separation because the shortest path from user "B" to any of these nodes requires transiting through one other node. Thus, from the standpoint of user "B", users "E", "F", "J", and "K" are deemed "friends of friends." Accordingly, user "B" is either a "friend" or a "friend of a friend" with every other user in the graph except for user "H", as the shortest path between user "B" and user "H" transits through two user nodes.

Figure 1B:
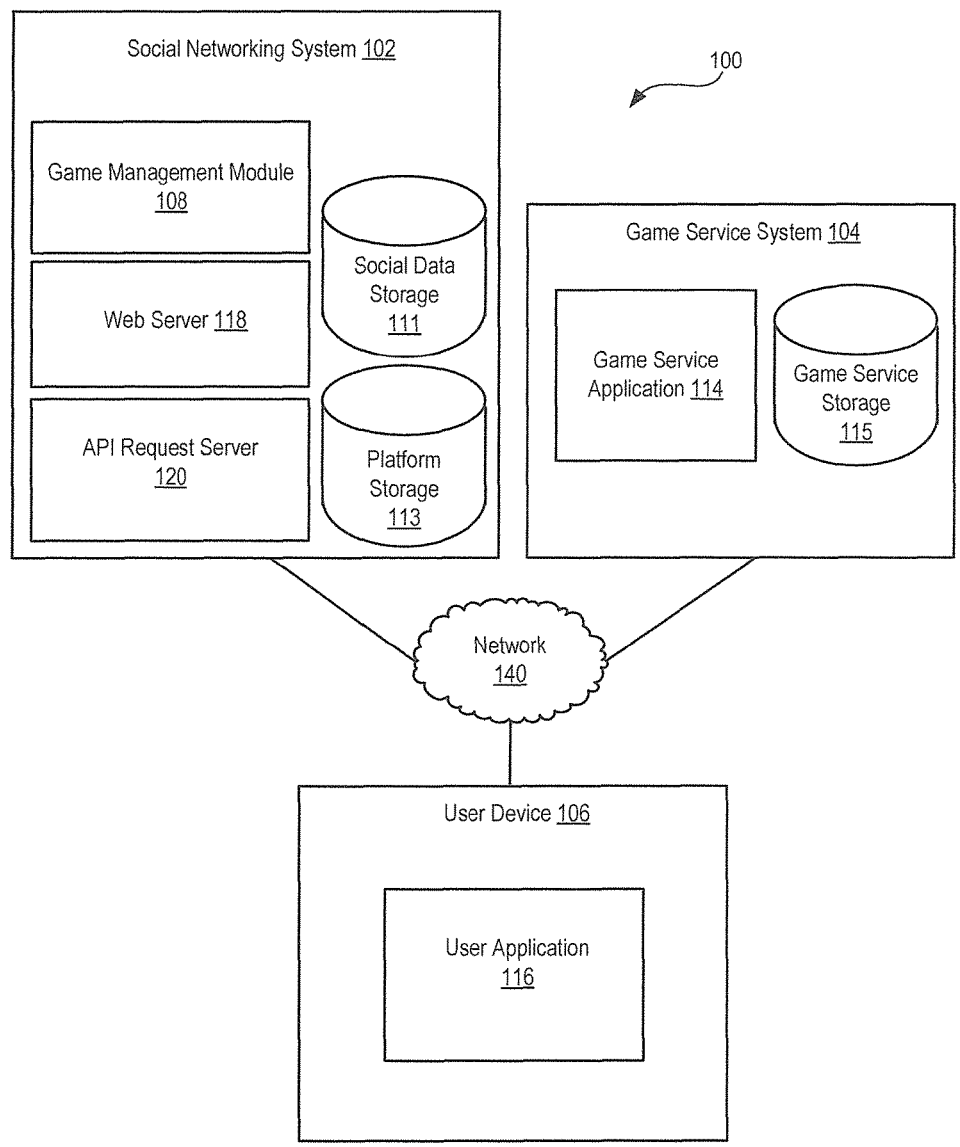
FIG. 1B illustrates a network diagram of a system for enabling player matching according to one embodiment of the invention.

FIG. 1B illustrates a network diagram of a system 100 for matching players of an online multiplayer game based on their skills and social proximity, according to one embodiment of the invention. The system 100 includes one or more user devices 106, one or more game service systems 104, the social networking system 102, and a network 140. For purposes of illustration, the embodiment of the system 100 includes a single game service system 104 and a single user device 106. However, in other embodiments, the system 100 may include more user devices 106 and/or more game service systems 104.

The game service system 104 can be separate from the social networking system 102 or can be part of the social networking system 102. For example, the game service system 104 and the social networking system 102 may be operated by different entities or the same entity. The game service system 104 can also be separate from the social networking system 102 in the sense that the game service system 104 is associated with one domain while the social networking system 102 is associated with a separate social networking domain. In one embodiment, each of the game service system 104 and the social networking system 102 is a computing system such as the exemplary system in FIG. 7.

A user device 106 comprises one or more computing devices that can receive input from a user and can transmit and receive data via the network 140. In one embodiment, the user device 106 is a computing system such as the exemplary system in FIG. 7. The user device 106 can be a conventional computer system executing an operating system (OS) such as a Microsoft Windows compatible OS, Apple OS X, and/or a Linux distribution. In another example, the user device 106 can be a mobile device having computer functionality, such as a personal digital assistant (PDA), mobile telephone, smart-phone, or other mobile computing device. The user device 106 is configured to communicate via the network 140. The user device 106 can execute a user application 116, for example, a browser application that allows a user of the user device 106 to interact with the social networking system 102. In another embodiment, the user device 106 interacts with the social networking system 102 through an application programming interface (API) that runs on the native operating system of the user device 106, such as iOS® 4 and ANDROID®. The user device 106 is configured to communicate with the game service system 104 and the social networking system 102 via the network 140, which may comprise any combination of local area and/or wide area networks (e.g., the Internet), using wired and/or wireless communication systems.

In one embodiment, the network 140 uses standard communications technologies and/or protocols. Thus, the network 140 can include links using technologies such as Ethernet, 802.11, worldwide interoperability for microwave access (WiMAX), 3G, 4G, CDMA, digital subscriber line (DSL), etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 140 can be represented using technologies and/or formats including the hypertext markup language (HTML) and the extensible markup language (XML). In addition, all or some links can be encrypted using conventional encryption technologies such as secure sockets layer (SSL), transport layer security (TLS), and Internet Protocol security (IPsec).

The user device 106 includes the user application 116 for displaying content from the game service system 104 and/or from the social networking system 102. For example, in one embodiment, the user device 106 displays content from the game service system 104 and/or from the social networking system 102 by processing a markup language document using a browser application. A markup language document can identify content and one or more instructions describing formatting or presentation of the content. By executing the instructions included in a markup language document, the user application 116 displays the identified content using the format or presentation described by the markup language document. In one such example, the markup language document includes instructions for generating and displaying a web page having multiple frames that include text and/or image data retrieved from the game service system 104 and/or from the social networking system 102. A markup language document may include a data file including extensible markup language (XML) data, extensible hypertext markup language (XHTML) data, or other markup language data. Additionally, a markup language document may include JavaScript Object Notation (JSON) data, JSON with padding (JSONP), and JavaScript data to facilitate lightweight data interchange between the user device 106 and the game service system 104 and/or the social networking system 102. In one such example, the user application 116 includes a JavaScript compiler to decode such a markup language document.

The game service system 104 includes one or more game service applications 114 and game service storage 115. The game service system 104 provides access to one or more multiplayer games via the one or more game service applications 114 over the network 140. The multiplayer games may be role-based games, first-person shooter games, turn-based games, real-time games, synchronous action games, asynchronous action games or any other games that involve multiple players in a game session. The game service system 104 provides web page content, which the user device 106 accesses via the network 140 with the user application 116.

While illustrated as being external to the social networking system, the game service system 104 may be a part of the social networking system in some embodiments.

Figure 1C:
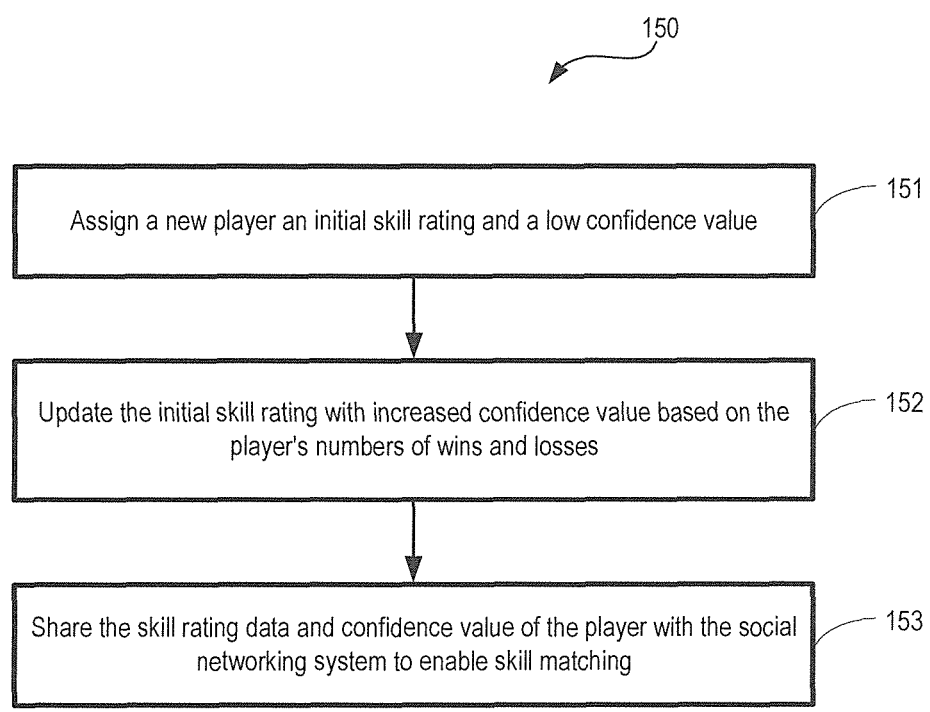
FIG. 1C illustrates a flow diagram for a method for providing a skill rating for a game, according to one embodiment of the invention.

In one embodiment, the game service system 104 provides a skill rating for each of its players who play a game. The skill rating for a player is typically a numerical value that has been determined based on a skill-rating algorithm. FIG. 1C is a flow diagram illustrating a method 150 for providing a skill rating for a game according to one embodiment of the invention. The method 150 can be executed by one or more processing devices (e.g., the computing system 700 of FIG. 7); for example, the processing devices that execute the operations of the game service system 104 of FIG. 1B. In one embodiment, at block 151, a new player is assigned an initial skill rating and a low confidence value, which is represented by a mean value and a large variance of a statistical distribution. At block 152, as the player completes more games sessions, the initial skill rating is updated with increased confidence value (i.e., smaller variance) based on the player's numbers of wins and losses. Of course, this is a very simplistic rating algorithm and other algorithms that take into account other aspects of gaming (such as the amount of time to a win, the number of kills/deaths, etc.) may be used to derive and maintain a skill rating. At block 153, the game service system 104 shares the skill rating data of its players with the social networking system 102 to enable skill matching based on the skill rating data. The game service system 104 may also share the confidence value of its players with the social networking system 102 such that players of similar skill consistency can be matched. The game service system 104 may also share additional information, such as name, location, demographics, etc., of its players with the social networking system 102 for matching players of the game. In some embodiments, the social networking system 102 may perform some of the operations of blocks 151 and 152 on behalf of the game service system 104 to obtain the skill rating data and confidence values.

Referring again to FIG. 1B, the social networking system 102 includes a web server 118, an application programming interface (API) request server 120 and platform storage 113. Platform storage 113 stores user preferences/settings, profile data, and other information for operation of the social networking system 102. The social networking system 102 includes platform applications. Examples of platform applications include applications for social interactions (e.g., publishing posts, pictures, etc.) as well as social games, messaging services, and any other application that uses the social platform provided by the social networking system 102. The web server 118 links the social networking system 102 to the user device 106 and/or the game service system 104 via the network 140. The web server 118 serves web pages, as well as other web-related content, such as Java, Flash, XML, and so forth. The web server 118 may include a mail server or other messaging functionality for receiving and routing messages between the social networking system 102 and the user device 106. The messages can be instant messages, queued messages (e.g., email), text and SMS messages, or any other suitable messaging format.

The Application Programming Interface (API) request server 120 allows one or more game service systems 104 and user devices 106 to access information from the social networking system 102 by calling one or more APIs. The API request server 120 may also allow the user device 106 to send requests or information to the social networking website by calling APIs. The user device 106, in one embodiment, sends an API request to the social networking system 102 via the network 140 and the API request server 120 receives the API request. The API request server 120 processes the request by calling an API associated with the API request to generate an appropriate response, which the API request server 120 communicates to the user device 106 via the network 140. In one embodiment, the one or more game service systems 104 communicate with the social networking system 102 via APIs in the same manner as the user device 106.

Users of the social networking system 102 can add connections to a number of other users of the social networking system 102 to whom they desire to be connected. As used herein, the term "friend" refers to any other user of the social networking system 102 to whom a user has formed a connection, association, or relationship via the social networking system 102. Connections may be added explicitly by a user or may be automatically created by the social networking system 102 (e.g., based on common characteristics of the users). For example, a first user specifically selects a particular other user to be a friend. Connections between users of the social networking system 102 are usually bilateral, or "mutual," but connections may also be unilateral, or "one-way." For example, if Bob and Joe are both users of the social networking system 102 and connected to each other, Bob and Joe are each other's friends. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation.

The social networking system 102 provides users with the ability to interact with each other through online games. A game management module 108 of the social networking system 102 manages information of the games that can be accessed and played via the social networking system 102. For example, a user may log into the social networking system 102 to play a game that is run on the social networking system 102 or on one of the game service systems 104. The information managed by the game management module 108 may be collected by the social networking system 102 or the game service systems 104. Examples of the information include both the players' information (such as the players' names, the players' demographics and locations, the skill rating of each player, the people with whom each player has played in the past, the number of times each player has completed a game, each player's pace of game playing, etc.), and the social data of the user (such as the user's friends, friends of friends, user profile, user online social activities, etc.).

FIG. 2 illustrates a diagram of matched players with whom a user 200 of the social networking system 102 may be suggested to play a game with, according to one embodiment of the invention. The user 200 is represented by the solid black dot in the center of the diagram. The players of the game are represented by a first space 210 (represented by the right circle), and the people who have social proximity with the user 200 are represented by a second space 220 (represented by the left circle). The second space 220 includes the user's friends 230, friends of friends 240, and people who are not direct or indirect friends of the user but have something in common with the user; for example, people who live in or come from the same city as the user, located in the same time zone, speak the same language, have the same demographics, graduated from the same school, play the same game or similar types of games, play the game or similar types of games with the same pace or same frequency, play games at the same time, people who share any common characteristics with the user, etc. The people in the second space 220 are users/members of the social networking system. In one embodiment, the social networking system 102 records each of these characteristics as a social attribute (or referred to as "attribute"). An intersection 250 of the first space 210 and the second space 220 includes the people who play the game and who have social proximity with the user. Within the intersection 250 is a wedge-shape space 260, which represents the people who play the game, have social proximity with the user, and have the same or similar skill level as the user. The people represented by the space 260 are the players that can be matched with the user. In one embodiment, the game management module 108 of the social networking system 102 identifies a list of the people represented by the space 260 from the intersection 250 of the first space 210 and the second space 220, and presents the list to the user for the user to send invitations for playing the game.

The size of the second space 220 can be determined by the social network system 102, or can be set by the user of the social network system 102. For example, the user may want to limit the second space 220 to include only friends, the people who plays at a similar pace as the user, the people who share the same specific set of common characteristics as the user, or any combination thereof.

In one embodiment, the list of matched players can be selected from the first space 210 based on respective skill levels. In another embodiment, the list of matched players can be selected from the second space 220 based on social proximity between the user and the players. In yet another embodiment, the list of matched players can be selected from both the first and the second space 210 and 220 based on respective skill levels and social proximity between the user and the players.

The skill level of a player for playing a game can be determined from the player's skill rating for the game. For example, the game service system 104 collects the player's win/loss data from past game sessions and, based on the win/loss data, the game service system 104 determines a skill rating of the player. The game service system 104 shares the skill rating data of its players with the social networking system 102. Different games may use different skill rating algorithms, and the range of skill ratings for different games can vary from a number of tens to a number of thousands. The game management module 108 of the social networking system 102 groups these skill ratings into a number of "buckets," such that each bucket contains players whose skill ratings are similar to each other. In the description herein, the terms "skill level bucket" and "bucket" have the same meaning and are used interchangeably. Each skill level bucket or bucket corresponds to a skill level. In an embodiment where the game service system 104 does not keep track of its players' win/loss data or does not provide skill ratings for its players, the social networking system 102 may perform these tasks for the game service system 104 for at least the players who are also members/users of the social networking system 102.

FIG. 3A illustrates an exemplary mapping between skill ratings and skill levels according to one embodiment of the invention. The skill ratings are first partitioned into a sequence of buckets. The total number of buckets in the sequence is less than the total number of skill ratings. In the example of FIG. 3A, the total number of buckets is thirty, although a different number may be used. The thirty buckets contain identifiers (such as a user ID) of players who play the game. Each bucket is defined by a contiguous range of skill ratings and contains the players whose skill ratings fall into that contiguous range. The range size of each bucket can be the same (as shown in the example of FIG. 3A) or different (as shown in the example of FIG. 3B).

FIG. 3B illustrates another exemplary mapping between skill ratings and skill levels according to another embodiment of the invention. In the example of FIG. 3B, the range size of a bucket is set such that the number of players is evenly distributed across the buckets. That is, the number of players in each bucket is the same or approximately the same. For example, for a bell-shaped skill rating distribution, the skill ratings of the majority of players are at or near the mean value of the distribution. Thus, the range size of the buckets can be smaller around the mid-point of the skill ratings distribution (e.g., skill rating=650-750 in FIG. 3B, which correspond to buckets 14-16 for a total of thirty buckets), and the range size can be larger towards both ends of the distribution.

As described above, each bucket represents a skill level (e.g, skill level 310, 320, 330, 340 or 350 of FIGS. 3A-B) for skill matching of the players. In one embodiment, a player of one skill level (e.g., skill level 320) may be matched with another player in an adjacent skill level (e.g., skill level 330). This is useful when a bucket does not contain sufficient number of players (e.g., less than a predetermined threshold value), or when a user's skill rating is near the boundary of a bucket (e.g., skill rating=201 in bucket_2 of FIG. 3A) and are likely to benefit from inviting co-players from an adjacent bucket in additional to the bucket where the user is located.

Figure 4:
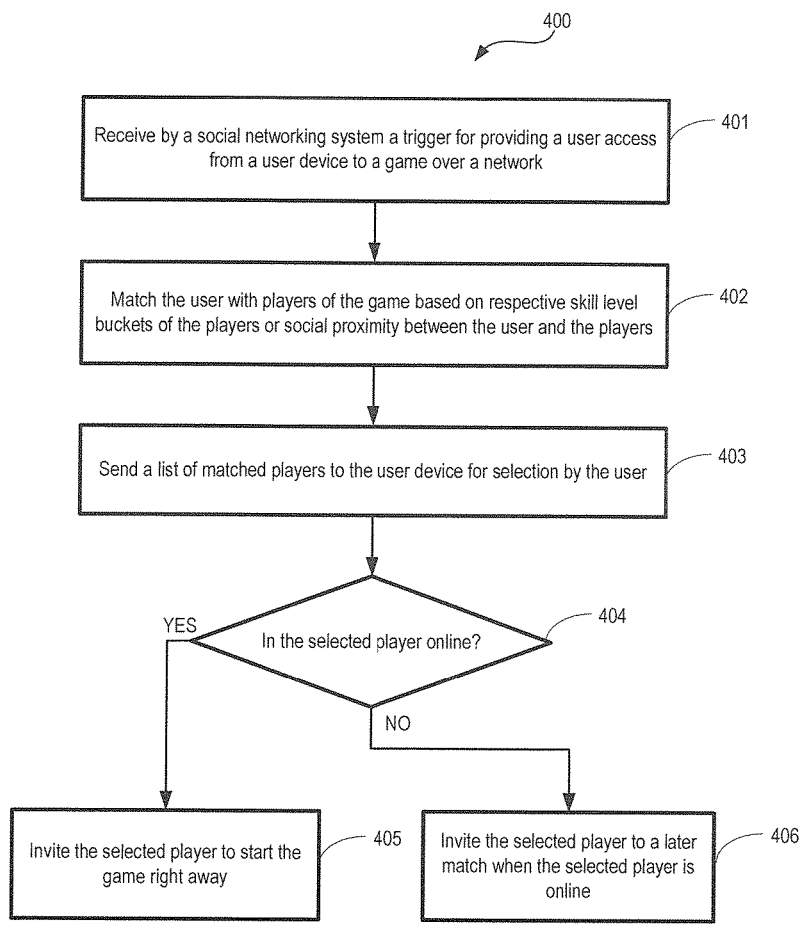
FIG. 4 illustrates a flow diagram for a method enabling player matching, according to one embodiment of the invention.

FIG. 4 illustrates a flow diagram for a method 400 for providing player matching for a game according to one embodiment of the invention. The method 400 can be executed by one or more processing devices (e.g., the computing system 700 of FIG. 7); for example, the processing devices that execute the operations of the social networking system 102 of FIG. 1B.

At block 401, a social networking system receives a trigger for providing a user access to a game over the network from a user device. The network may be the network 140 of FIG. 1B. The trigger may occur at least in part by the user selecting an identifier of the game (e.g., an icon, a name, a link or another indicator) on the user device. The identifier of the game may be accessible from the user's home page or other pages in the social networking system, or may be located by the user entering the game title into a search tool provided by the social networking system. The trigger may also occur when the user logs into his/her social networking account and/or when a promotional campaign for the game is underway. At block 402, the social networking system matches the user with players of the game based on respective skill levels and/or social proximity between the user and the players. In one embodiment, the social networking system identifies the matched players that have the same (or similar) skill level as the user and/or determines social proximity based on common characteristics between the user and the players. The common characteristics can be determined from data collected by the social networking network. Examples of the data include but are not limited to: information provided by the user to the social networking system, information provided by a game service system hosting the game to the social networking system, and information provided by other users of the social networking system. At block 403, the social networking system sends a list of matched players to the user device for selection by the user device. In return, the social networking system receives from the user device one or more selected players. In one embodiment, the game service system may also receive the one or more selected players from the user device or the social networking system. The social networking system then sends an invitation to the one or more of selected players to enable the user to play the game over the network with these players. In alternative embodiments, the game service system or the user device sends the invitation to the one or more of selected players. In some embodiments, when the necessary number of players for the game accepts the invitation, a new game session can be started. In other embodiments, the social networking system determines at block 404 whether a selected player is online before sending the invitation. If the selected player is online, an invitation is sent to that player to start the game right away at block 405. If the selected player is not online, an invitation to a future game is sent to that player at block 406. It is contemplated that co-players of some asynchronous games do not have to be online at the same time. For example, in a turn-based game such as chess, two players may be online at different times while playing against each other.

Figure 5:
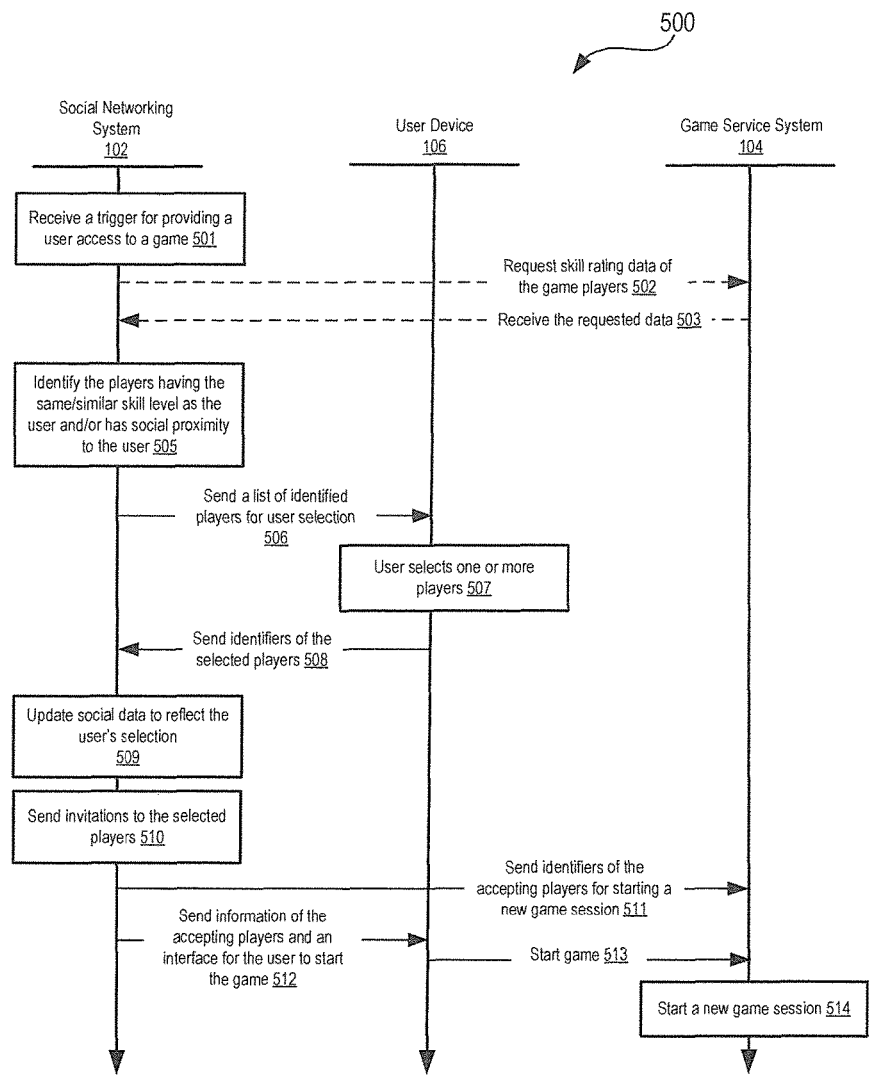
FIG. 5 illustrates a message exchange diagram amongst a social networking system, a user device, and a game service system, according to one embodiment of the invention.

FIG. 5 illustrates a message exchange diagram 500 amongst the social networking system 102, the user device 106, and the game service system 104 according to one embodiment of the invention. The message exchange diagram 500 provides one exemplary embodiment of the method described with reference to FIG. 4. The message exchange enables a user of the social networking system 102 to identify other players of a game that have matched skill levels and social proximity.

The message exchange of diagram 500 begins with the social networking system 102 receiving a trigger for providing access to a game to the user (501). The trigger may occur in response to one or more of the following: the user has logged into the social networking system 102, the user has selected a game to play, a friend of the user has completed a session of the game, a promotional campaign for the game, and/or other events or activities. Upon receiving the trigger, the social networking system 102 requests the game service system 104 for skill rating data of the game players (502) and receives the requested data in return (503). In an alternative embodiment, the social networking system 102 may store the skill rating data and players' information in a local or internal storage (e.g., the platform storage 113 of FIG. 1B), and requests for updates periodically as the skill rating data and players' information generally do not change rapidly. Thus, in this alternative embodiment, it is not necessary to perform the message exchanges of 502 and 503 in response to the request from the user device 104.

Based on the skill rating data and the social data collected by the social networking system 102, the social networking system 102 identifies the players having the same or similar skill level as the user and having social proximity to the user (505). In the parlance of what was described earlier, these players would be in the same bucket (i.e., skill level) or neighboring bucket as the user. The social networking system 102 then sends a list of matched players to the user device 106 for user selection (506). In one embodiment, the user device 106 sends an API request to the social networking system 102 for player match, and receives the list of matched players from the social networking system 102 via an API. For each matched player, the social networking system 102 may also send his/her attributes or characteristics that are in common with the user, if such attributes or characteristics are not blocked for privacy concerns. The user selects one or more players from the list (507), and sends the identifiers of the selected one or more players to the social networking system 102 (508). The social networking system 102 then updates the social data to reflect the user's selection (509), and sends an invitation to the selected one or more players (510). In alternative embodiments, the user device 106 or the game service system 104 sends the invitation to the selected one or more players. The social networking system 102 then sends the identifiers of the one or more players who accept the invitation to the game service system 104 for starting a new game session (511). In alternative embodiments, the invitation may be sent by the user device 106 or the game service system 104. The social networking system 102 also sends the information (e.g., name, profile photo, skill rating, etc., if such information is not blocked by the player for privacy) of the one or more players who accept the invitation to the user device 106, as well as an interface for accessing the game service system 104 to start the game (512). In one embodiment, the social networking system 302 sends HTML content for rendering by a browser application on the user device 106. The user may start the game by sending a request to the game service system 104 via the interface (513). Upon receiving the request, the game service system 104 starts a new game session for the user and the one or more players who accept the invitation to play the game (514).

Figure 6A:
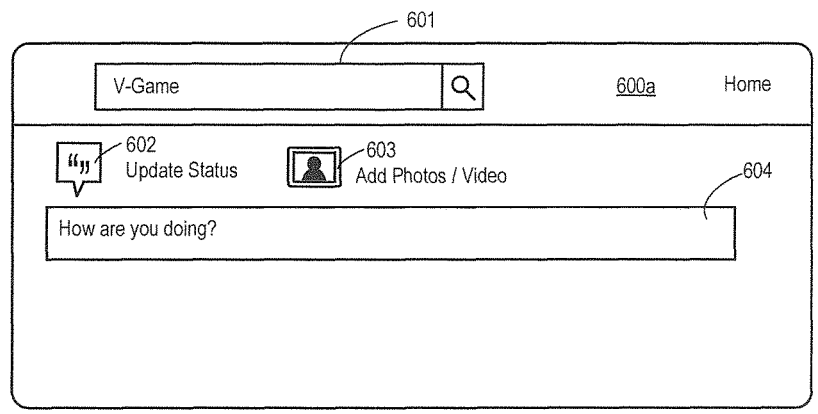
FIGS. 6A-6D illustrate exemplary GUI windows enabling player selection on a user device, according to embodiments of the invention.

FIGS. 6A-6D illustrate exemplary GUI windows displaying a player matching interface on a user device according to embodiments of the invention. In one embodiment, the player matching interface is provided by the social networking system to enable a dialog between the user device and the social networking system. FIG. 6A illustrates an example of a GUI window 600a of a user's home page hosted by a social networking system (e.g., the social networking system 102 of FIG. 1B). For example, the GUI window 600a can be rendered from HTML content sent by the social networking system to a user device (e.g., the user device 106 of FIG. 1B). The icons 602 and 603 indicate different actions that a user can take, for example, "Update Status" (which posts the message that the user writes into the space 604) and "Add Photos/Video" (which posts the user's photos or video uploaded into the social networking system). Other, more, or fewer user actions are also possible. For example, another option may be "Play Games," which is linked to a list of games that the user has played in the past or may be interested in playing. The user may select one of the games from the list to request starting the game.

The GUI window 600a also provides a search tool 601, which enables the user to search for people, places and things within the social networking system and the World Wide Web. In one embodiment, the search tool 601 is a graph search that performs search based on a social graph or other graph-based data. When a user enters the title of a game that he/she wishes to play, the search tool 601 will locate a link to the game service system hosting the game (e.g., the game service system 104 of FIG. 1B). The link may be displayed on the GUI as an icon or an identifier identifying the game. When the user selects the link, another GUI window 600b is displayed that enables the user to select a co-player of the game. Although the selection of one co-player is described below, it is understood that the following description applies to the selection of any number of co-players.

Figure 6B:
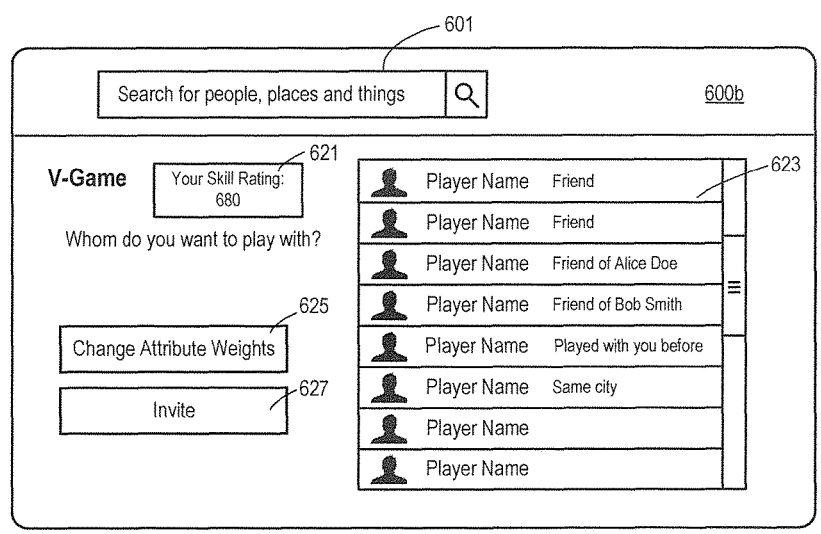

FIG. 6B illustrates the GUI window 600b displayed after the user has selected a game to play. The GUI window 600b displays the game title ("V-Game"), and may also display the skill rating of the user (either automatically or when requested by the user). Based on the skill level of the user and social proximity between the user and the other players of the game, the social networking system identifies a list 623 of matched players for the user to select (e.g., according to the method 400 described above with reference to FIG. 4). The list 623 may be alphabetically-ordered, ordered by skill ratings, or common characteristics in the social data. The common characteristics in the social data are used to determine social proximity between the user and the other players of the game. Each characteristic is a social attribute maintained and updated by the social networking system. Some of the attributes can weigh more than other attributes. In one embodiment, the GUI window 600b displays the one or more common characteristics (or the most-weighted common characteristic) for which a player is chosen to be in the list 623, when displaying such information does not violate the player's privacy settings. For example, the list 623 can show that players A and B are the user's friends, player C is a friend of Alice Doe (where Alice Doe is a friend of the user; i.e., player C is a friend of a friend), player D is a friend of Bob Smith (where Bob Smith is a friend of the user; i.e., player D is a friend of a friend), player E has played with the user before, and player F lives in the same city as the user. The user may select any player from the list 623 and activate an "Invite" button 627 to cause an invitation to be sent to the selected player. In one embodiment, the social networking system via an API provides the list 623 of matched players, and the user device renders the list 623 displayed in the GUI window 600b.

In one embodiment, a user can change the weights of the social attributes. For example, a user may prefer to play a synchronous action game with co-players in the same time zone, and may not mind where the co-players are located for asynchronous action games. In one embodiment, the GUI window 600b provides a "Change Attribute Weights" button 625 or a similar selector, which enables the display of another GUI window 600c for the user to change the weights of the social attributes used by the social networking system in identifying the list 623 of matched users.

Figure 6C:
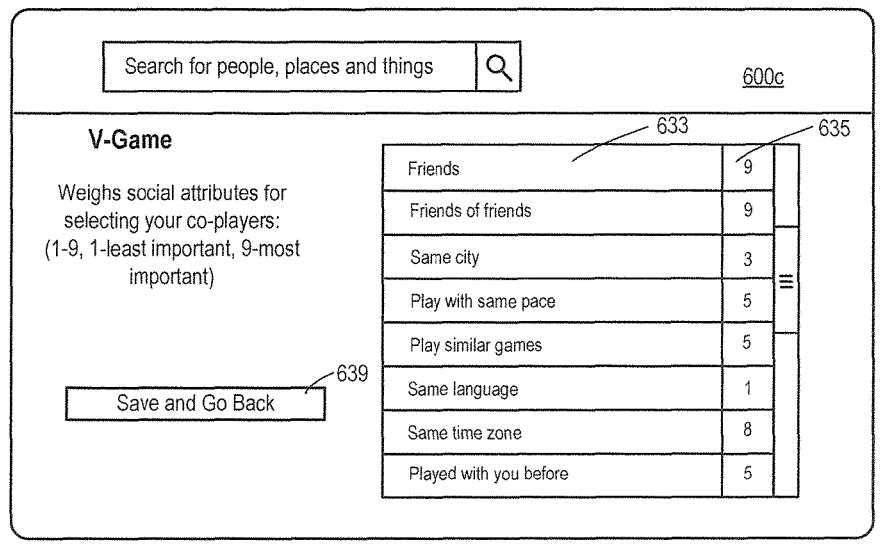

FIG. 6C illustrates the GUI window 600c. The GUI window 600c can be displayed after the user has selected the "Change Attribute Weights" button 625 and before the user selected the "Invite" button 627. In the example of FIG. 6C, the GUI window 600c displays a list 633 that contains some of the social attributes used by the social networking system for evaluating social proximity. The attributes are collected by the social networking system from a user's profile, settings, uploaded data, likes, postings, messages sent and/or received, information provided by other users of the social networking system, and activities in the social networking system. The attributes can also be collected by the social networking system from the game service system that hosts the game to be played. In one embodiment, each attribute in the list 633 is associated with a weight field 635 having a weight ranging from 1 to 9, where 1 indicates the least important and 9 indicates the most important. The GUI window 600c provides a mechanism for the user to enter and change the attribute weights. Alternative mechanisms may be provided for the user to adjust the weights of the attributes. After the user has adjusted the weights in the field 635, the user may select the "Save and Go Back" button 639 to save the current attribute weights and go back to the GUI window 600b of FIG. 6B. In one embodiment, the social networking system can evaluate or update the matched players in the list 623 of FIG. 6B based on the saved attribute weights, and the user can then select a co-player from the list 623 to send an invitation to play.

In an alternative embodiment, the GUI window 600c may include buttons or other selectors that enable the user to assign a numerical weight to each attribute, remove an attribute from consideration, or add an attribute from previously removed attributes.

In one embodiment, the social networking system can implement a machine learning mechanism that automatically learns the weights of the attributes from the user's previous co-player selections. For example, the social networking system can learn how often a particular player is selected by the user and increase the "frequently selected" attribute of that player. The social networking system can also learn how engaged a particular player is when playing the game and adjust the "degree of play engagement" attribute accordingly (e.g., measured by how often the player quits without completing the game, how early in the game the player quits, etc.). The social networking system can also learn which ones of the social attributes are weighted the most by the user based on the user's previous selections. For example, if the user consistently or frequently selects co-players who live in the same city, the attribute "same city" can be given a higher weight than other attributes. If the user never or seldom selects co-players who speak the same language, the attribute "same language" can be given a lower weight than other attributes.

Figure 6D:
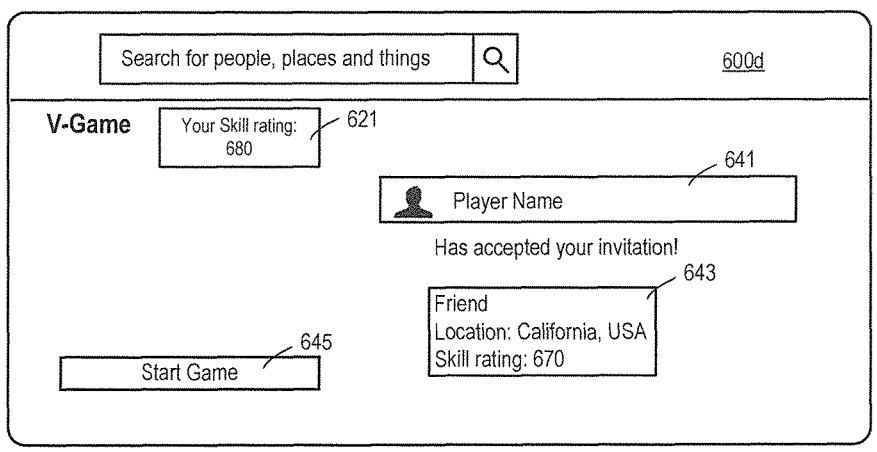

FIG. 6D illustrates the GUI window 600d. The GUI window 600d can be displayed after the user has selected the "Invite" button 627 of FIG. 6B. In the example of FIG. 6D, the GUI window 600d displays the name 641 of the player that accepted the user's invitation, as well as some other attributes 643 of the player if such information is not blocked by the selected player for privacy concerns. For example, the GUI window 600d may display the player's skill rating for the game, one or more of the player's attributes (e.g., friend and location) that contribute to the social proximity to the user, and/or one or more other notable attributes of the player that can be shared with the user. The GUI window 600d may also display the user's skill rating 621 for the game. The user may select the "Start Game" 645 button to start the game.

Figure 7:
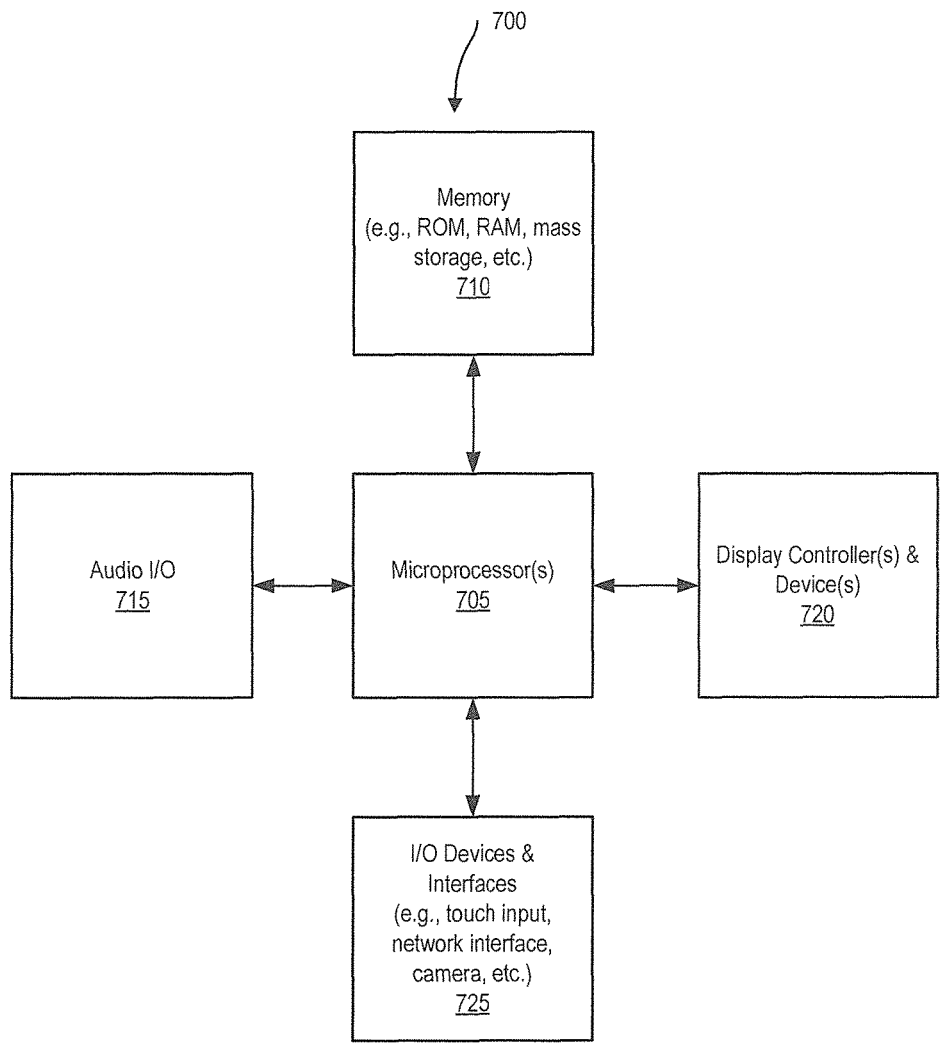
FIG. 7 illustrates a computing system in which embodiments may operate, be installed, integrated, or configured.

FIG. 7 illustrates, in block diagram form, an exemplary computing system 700 in accordance with which embodiments may operate, be installed, integrated, or configured. The computing system 700 includes one or more microprocessors 705 and connected system components (e.g., multiple connected chips). Alternatively, the computing system 700 is a system on a chip.

The computing system 700 includes memory 710, which is coupled to the microprocessor(s) 705. The memory 710 may be used for storing data, metadata, and programs for execution by the microprocessor(s) 705. The memory 710 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 710 may be internal or distributed memory.

The computing system 700 also includes an audio input/output subsystem 715 which may include a microphone and/or a speaker for, for example, playing back music or other audio, receiving voice instructions to be executed by the microprocessor(s) 705, playing audio notifications, etc.

A display controller and display device 720 provides a visual user interface for the user. In an embodiment where the computing system 700 is an exemplary representation of the user device 106 of FIG. 1B, the display device 720 may display the GUI windows illustrated in FIGS. 6A-6D.

The computing system 700 also includes one or more input or output ("I/O") devices and interfaces 725, which are provided to allow a user to provide input to, receive output from, and otherwise transfer data to and from the system. These I/O devices 725 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the computing system 700.

The I/O devices and interfaces 725 may also include a connector for a dock or a connector for a USB interface, FireWire, Thunderbolt, Ethernet, etc. to connect the computing system 700 with another device, external component, or a network. Exemplary I/O devices and interfaces 725 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the computing system 700 with another device, external component, or a network and receive stored instructions, data, tokens, etc.

It will be appreciated that one or more buses, may be used to interconnect the various components shown in FIG. 7.

In one embodiment, the computing system 700 is an exemplary representation of the user device 106 of FIG. 1B. The computing system 700 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In another embodiment, the computing system 700 is an exemplary representation of a server computer in the social networking system 102 and/or the game service system 104 of FIG. 1B. In other embodiments, the computing system 700 may be a network computer, server, or an embedded processing device within another device or consumer electronic product. As used herein, the terms computer, system, device, processing device, and "apparatus comprising a processing device" may be used interchangeably with the computing system 700 and include the above-listed exemplary embodiments.

It will be appreciated that additional components, not shown, may also be part of the computing system 700, and, in certain embodiments, fewer components than that shown in FIG. 7 may also be used in a computing system 700. It will be apparent from this description that aspects of the inventions may be embodied, at least in part, in software. That is, computer-implemented methods may be carried out in a computer system or other data processing system in response to its processor or processing system executing sequences of instructions contained in a memory, such as memory 710 or other non-transitory machine-readable storage medium. The software may further be transmitted or received over a network (not shown) via a network interface device 725. In various embodiments, hardwired circuitry may be used in combination with the software instructions to implement the present embodiments. Thus, the techniques are not limited to any specific combination of hardware circuitry and software, or to any particular source for the instructions executed by the computing system 700.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A method comprising:
   receiving, by a communication system, a trigger for providing a user of the communication system access from a user device to a game over a network;
   matching the user with players of the game having similar respective skill levels to the user and based on social proximity between the user and the players, wherein the user and each of the players are mapped to skill level buckets having a contiguous range of skill ratings corresponding to the respective skill levels of the user and each of the players, wherein the user and a set of the players have the similar respective skill levels when the user and the set of the players are mapped to a same skill level bucket, and wherein the social proximity between the user and the players is determined by:
      determining whether the user and the players share common characteristics based on data collected by the communication system, and
      determining the social proximity based on the common characteristics;
   generating a list of matched players of the game based on the matching;
   sending the list of matched players to the user device for selection by the user; and
   sending an invitation on behalf of the user to one or more of the players selected by the user to enable the user to play the game over the network with the one or more players.

2. The method of claim 1, wherein matching the user further comprises:
   maintaining a mapping between skill ratings to skill level buckets; and
   identifying the players that are in the same skill level bucket as the user.

3. The method of claim 2, further comprising:
   obtaining, by the communication system, the skill ratings of the players over the network from a game service system that hosts the game.

4. The method of claim 1, wherein matching the user further comprises:
   matching skill consistency between the user and the players, wherein the skill consistency is indicated by a variance associated with the skill rating.

5. The method of claim 1, wherein the data collected by the communication system includes information provided by the user to the communication system, information provided by a game service system hosting the game to the communication system, and information provided by other users of the communication system.

6. The method of claim 1, further comprising:
   receiving a change to weights of social attributes from the user; and
   using the weights of the social attributes to determine the list of matched players.

7. The method of claim 1, further comprising:
   determining the social proximity between the user and the players based on a list of weighted social attributes; and
   learning from selections made by the user to adjust weights of the weighted social attributes.

8. A computer-readable storage medium storing instructions, which when executed by a processing device, cause the processing device to perform a method comprising:
   receiving, by a communication system, a trigger for providing a user of the communication system access from a user device to a game over a network;
   matching the user with players of the game having similar respective skill levels to the user and based on social proximity between the user and the players, wherein the user and each of the players are mapped to skill level buckets having a contiguous range of skill ratings corresponding to the respective skill levels of the user and each of the players, wherein the user and a set of the players have the similar respective skill levels when the user and the set of the players are mapped to a same skill level bucket, and wherein the social proximity between the user and the players is determined by:
      determining whether the user and the players share common characteristics based on data collected by the communication system, and
      determining the social proximity based on the common characteristics;
   generating a list of matched players of the game based on the matching;
   sending the list of matched players to the user device for selection by the user; and
   sending an invitation to one or more of the players selected by the user to enable the user to play the game over the network with the one or more players.

9. The computer-readable storage medium of claim 8, wherein matching the user further comprises:

maintaining a mapping between skill ratings to skill level buckets; and identifying the players that are in the same skill level bucket as the user.

10. The computer-readable storage medium of claim 9, wherein the method further comprises:

obtaining the skill ratings of the players over the network from a game service system that hosts the game.

11. The computer-readable storage medium of claim 8, wherein matching the user further comprises:

matching skill consistency between the user and the players, wherein the skill consistency is indicated by a variance associated with the skill rating.

12. The computer-readable storage medium of claim 8, wherein the data collected by the communication system includes information provided by the user to the communication system, information provided by a game service system hosting the game to the communication system, and information provided by other users of the communication system.

13. The computer-readable storage medium of claim 8, wherein the method further comprises:

receiving a change to weights of social attributes from the user; and using the weights of the social attributes to determine the list of matched players.

14. The computer-readable storage medium of claim 8, wherein the method further comprises:

determining the social proximity between the user and the players based on a list of weighted social attributes; and learning from selections made by the user to adjust weights of the weighted social attributes.

15. An apparatus comprising:

a display; and a processing device coupled to the display, wherein the processing device is to execute instructions that cause the apparatus to:

receive a list of players from a communication system, wherein a user is matched with the players in the list for playing a game having similar respective skill levels to the user and based on social proximity between the user and the players, wherein the user and each of the players are mapped to skill level buckets having a contiguous range of skill ratings corresponding to the respective skill levels of the user and each of the players, wherein the user and a set of the players have the similar respective skill levels when the user and the set of the players are mapped to a same skill level bucket, and wherein the social proximity between the user and the players is determined by:

determining whether the user and the players share common characteristics based on data collected by the communication system, and determining the social proximity based on the common characteristics;

generate a list of matched players of the game based on the matching;

display the list of matched players on the display;

receive a selection of one or more of the players from the user; and send an invitation to the one or more players to play the game over the network with the one or more players.

16. The apparatus of claim 15, wherein the contiguous range of skill ratings is determined by win and loss data of game playing.

17. The apparatus of claim 15, wherein the social proximity indicates whether the user and the players share common characteristics based on data collected by the communication system.

18. The apparatus of claim 15, wherein the social proximity is determined based on a list of weighted social attributes, and wherein the processing device is to execute instructions that cause the apparatus to adjust weights of the weighted social attributes according to user input or based on machine learning.

* * * * *